United States Patent [19]
Daoud

[11] Patent Number: 5,959,250
[45] Date of Patent: Sep. 28, 1999

[54] SEALING DEVICE FOR TELECOMMUNICATIONS EQUIPMENT ENCLOSURES

[75] Inventor: Bassel H. Daoud, Parsippany, N.J.

[73] Assignee: Lucent Technologies Inc., Murray Hill, N.J.

[21] Appl. No.: 09/104,581

[22] Filed: Jun. 25, 1998

[51] Int. Cl.[6] .................................................. H02G 3/18
[52] U.S. Cl. .......................... 174/65 R; 174/135; 248/56; 16/2.1; 439/718
[58] Field of Search ................................ 174/65 R, 65 G, 174/135, 151, 152 G, 153 G, 153 R, 167, 67; 248/56; 16/2.1, 2.2; 439/942, 718

[56] References Cited

U.S. PATENT DOCUMENTS

| | | | |
|---|---|---|---|
| 3,873,757 | 3/1975 | Berke et al. | 174/52.1 |
| 3,927,785 | 12/1975 | Kinney et al. | 220/3.8 |
| 4,109,095 | 8/1978 | Kling et al. | 174/67 |
| 4,424,407 | 1/1984 | Barbic | 174/67 |
| 4,733,015 | 3/1988 | Barnes | 174/65 R |
| 5,378,174 | 1/1995 | Brownlie et al. | 439/709 |
| 5,568,362 | 10/1996 | Hansson | 361/736 |

FOREIGN PATENT DOCUMENTS

| | | | |
|---|---|---|---|
| 9422195 | 9/1994 | WIPO | 174/65 R |

*Primary Examiner*—Kristine Kincaid
*Assistant Examiner*—Dhiro R Patel

[57] ABSTRACT

An enclosure for telecommunications equipment has a base and a lid pivotally connected to the base. The enclosure has an aperture defined by aperture edges through which one or more wires can be fed. A first elastically deformable insert is attached to a mounting surface on the base and a second elastically deformable insert is attached to a mounting surface on the lid, both adjacent to the aperture, such that when the lid is closed, the first and second inserts deform under contact with each other and with any wires fed through the aperture to reduce the size of gaps between the wires and the aperture edges. In one embodiment, the inserts have slots that enable non-continuous deformations to provide better sealing characteristics.

8 Claims, 4 Drawing Sheets

SEALING DEVICE FOR TELECOMMUNICATIONS EQUIPMENT ENCLOSURES

BACKGROUND OF THE INVENTION

1. Field of the Invention

The present invention relates to telecommunications equipment, and, in particular, to enclosures for housing and protecting telecommunications equipment.

2. Description of the Related Art

A building entrance protector (BEP) is an enclosure used to house and protect telecommunications equipment. For example, a BEP may house the components used to interface between a multi-wire cable providing telephone service to a building and the twisted pairs of copper wire for individual telephones distributed throughout the building. These interface components may include connectors, such as insulation displacement connectors (IDCs), as well as electrical isolation components, such as high-voltage/high-current plug-in protectors. The BEP may have two or more hinged pieces that define one or more different compartments within the BEP for such functions as breaking out wires from the multi-wire cable, splicing two cables together, connecting cable wires to electrical isolation components, connecting the electrical isolation components to IDC connectors, and terminating the twisted pairs at the IDC connectors.

A conventional BEP has one or more apertures in its side walls through which individual or bundles of twisted pairs are fed to connect the various individual telephones to the interface components housed in the BEP. BEPs are usually built in one or more standard configurations, each of which is designed to handle a variety of applications in which the number of twisted pairs or other wires fed through the BEP apertures can vary widely. Since an aperture is designed to accommodate a specified maximum number of wires, when fewer than the maximum number of wires are fed through the aperture, gaps will exist between the wires and the edges of the BEP that define the aperture, through which dust and other contaminants can enter the BEP interior. Even when the aperture is used with the specified maximum number of wires, there will still typically be gaps that will allow contaminants to pass. Over time, accumulations of dust and other such contaminants can adversely affect the ability of the interface components housed within a BEP to continue to perform their desired functions.

In some BEPs, rubber grommets are inserted in the apertures to limit the amount of dust that can enter the BEP interior through the apertures. Such grommets may be designed with removable material to increase the size of the opening in the grommet. According to these designs, more and more grommet material can be removed from the grommet to accommodate more and more wires as the number of wires fed through an aperture increases. One limitation of such a scheme is that it is irreversible. Once grommet material is removed, it cannot be replaced, if, for example, the number of wires to be accommodated by the aperture decreases, rather than increases, over time. The result is once again gaps between the wires and the remaining grommet material through which dust can pass. Alternatively, a new grommet can be used, but this would increase the cost of operations.

SUMMARY OF THE INVENTION

The present invention is directed to a scheme for reducing the amount of dust and other contaminants that can enter a BEP through the apertures defined in the BEP side walls through which twisted pairs and other wires are fed.

In one embodiment, the present invention is an enclosure for telecommunications equipment, comprising a base and a lid pivotally connected to the base. The enclosure has an aperture defined by aperture edges through which one or more wires can be fed. A first elastically deformable insert is attached to a mounting surface on the base and a second elastically deformable insert is attached to a mounting surface on the lid, both adjacent to the aperture, such that when the lid is closed, the first and second inserts deform under contact with each other and with any wires fed through the aperture to reduce the size of gaps between the wires and the aperture edges.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1A:
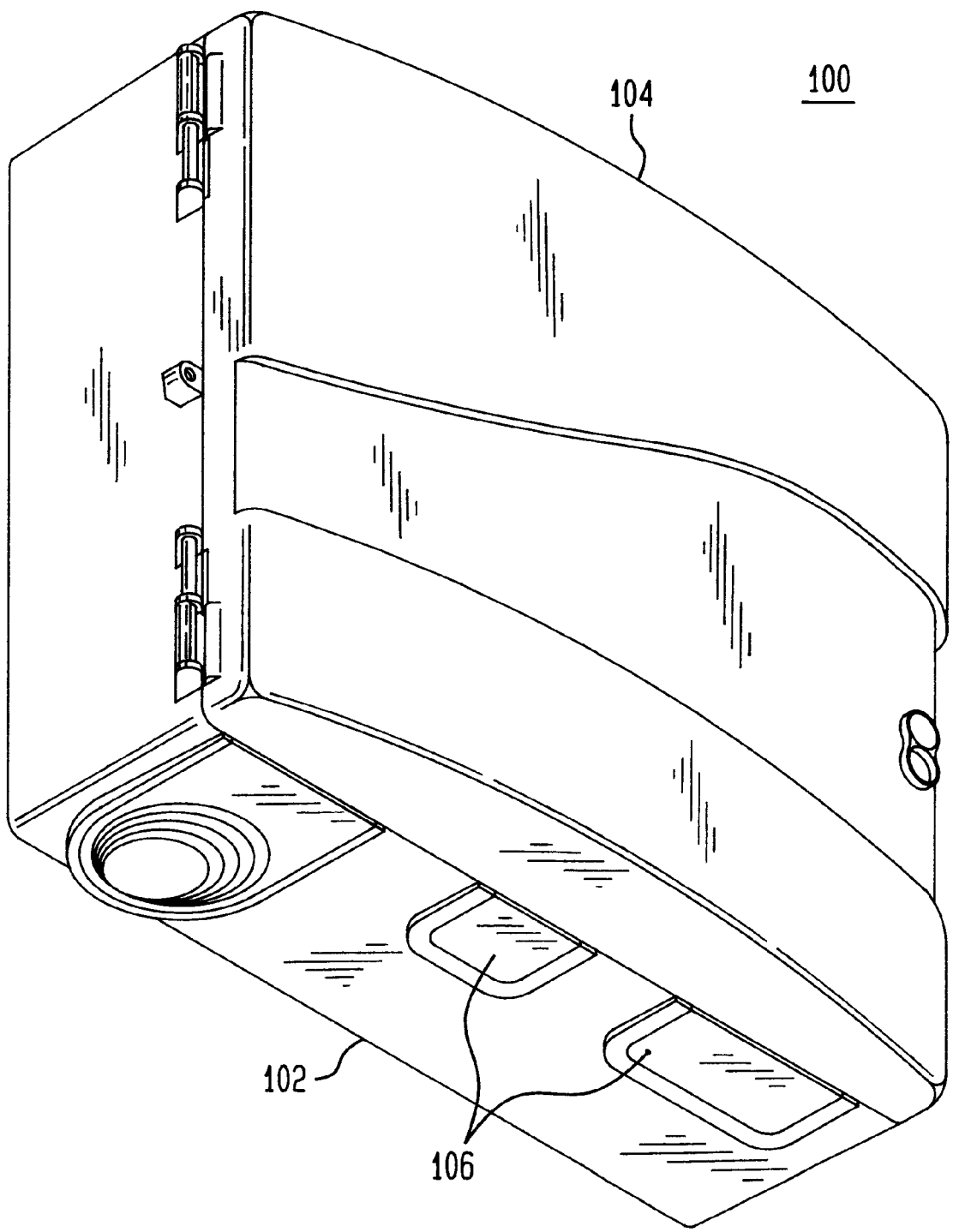
FIGS. 1A and 1B show a building entrance protector in its closed and open states, respectively, that can be used with one embodiment of the present invention.
Figure 1B:
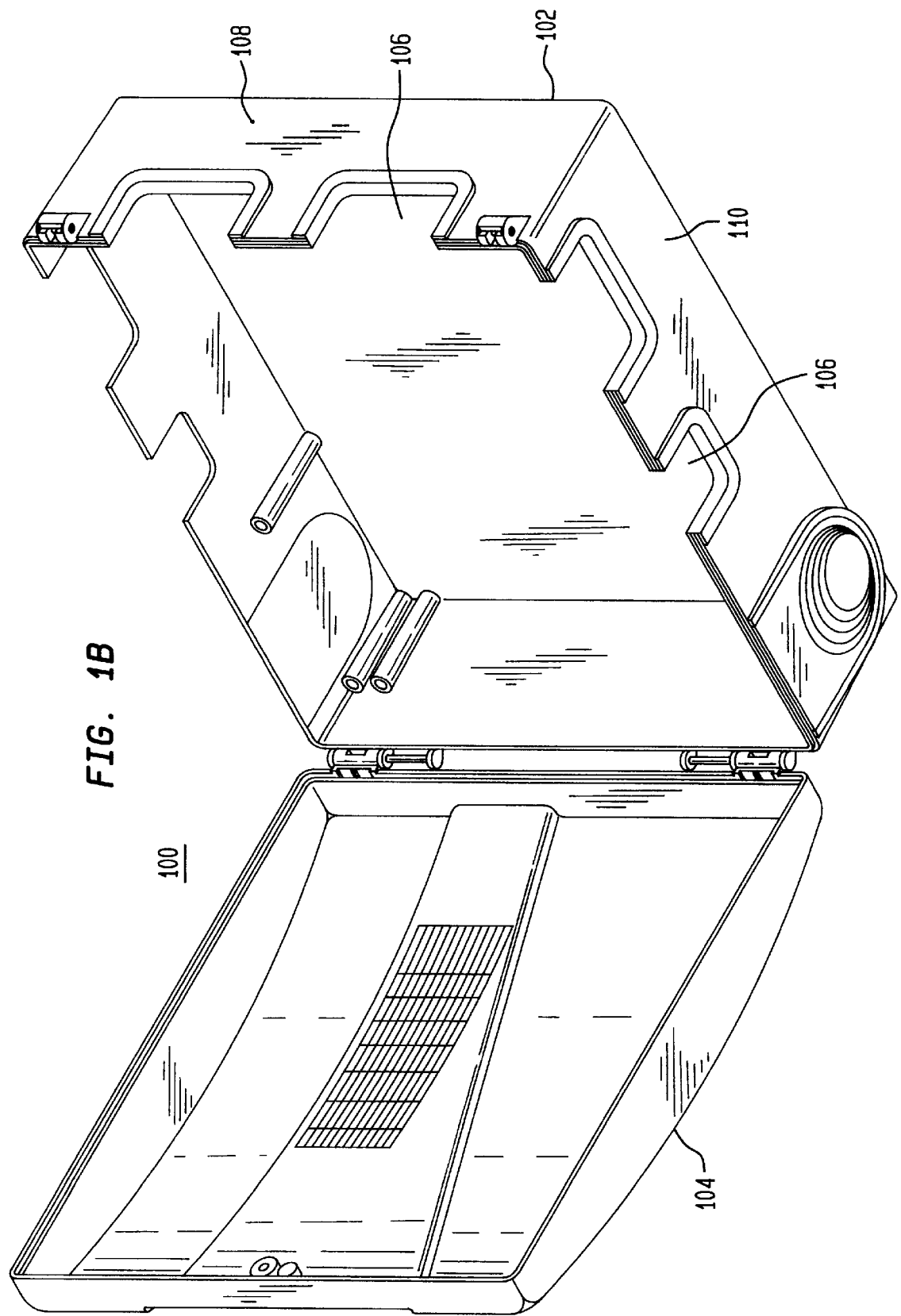

FIGS. 1A and 1B show a building entrance protector 100 in its closed and open states, respectively, that can be used with one embodiment of the present invention. BEP 100 has a base 102 and a pivoting lid 104 that provides the user with access to the interior of BEP 100. When lid 104 is closed, troughs 106 in base 102 define apertures in BEP 100 through which wires can be fed. Wire retainers may be inserted within troughs 106 to keep the wires in place when lid 104 is opened and to prevent crimping or "guillotining" of wires between the side walls of base 102 and lid 104, when lid 104 is closed.

According to one embodiment of the present invention, two elastically deformable inserts (e.g., made of a suitable flexible foam material) are attached to BEP 100 for each trough 106—one insert attached to a mounting surface on the BEP base and the other insert attached to a mounting surface at a corresponding location on the BEP lid, where the mounting surfaces are as close as practicable to the trough. When the lid is closed the inserts are deformed—by contact with each other and with any wires held by the wire retainer in the trough—to reduce the size of gaps that would otherwise exist between the wires and the edges of the aperture.

Figure 2:
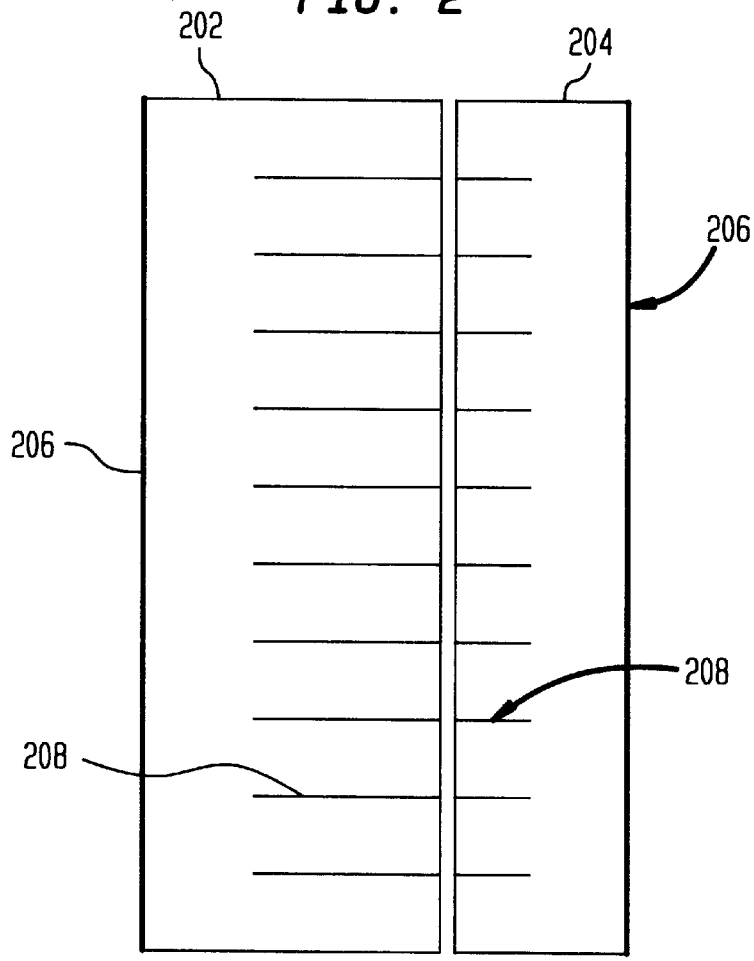
FIG. 2 shows a side view of two inserts, according to one embodiment of the present invention.

FIG. 2 shows a side view of two inserts 202 and 204, according to one embodiment of the present invention. Each insert has an adhesive backing 206 on one side to attach the insert to the appropriate BEP mounting surface. In addition, each insert has one or more slots 208, substantially perpendicular to the adhesive-backed sides. These slots, which may be made by cutting the inserts without removing any of the insert material, provide increased localized deformability for possible non-continuous deformations, thereby providing better sealing characteristics.

Figure 3A:
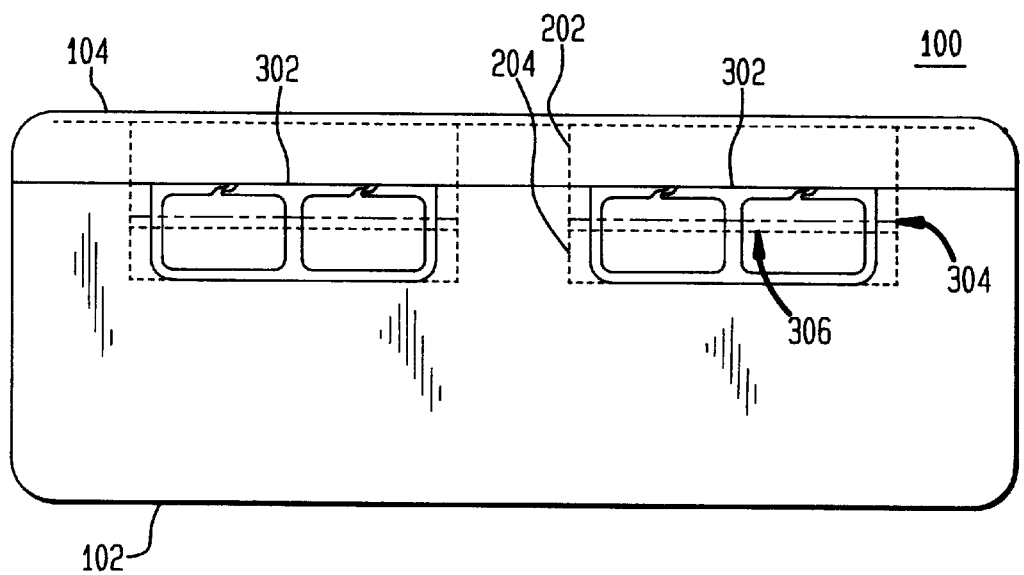
FIGS. 3A and 3B show side and cross-section views, respectively, of a building entrance protector in which inserts have been mounted, according to the present invention.
Figure 3B:
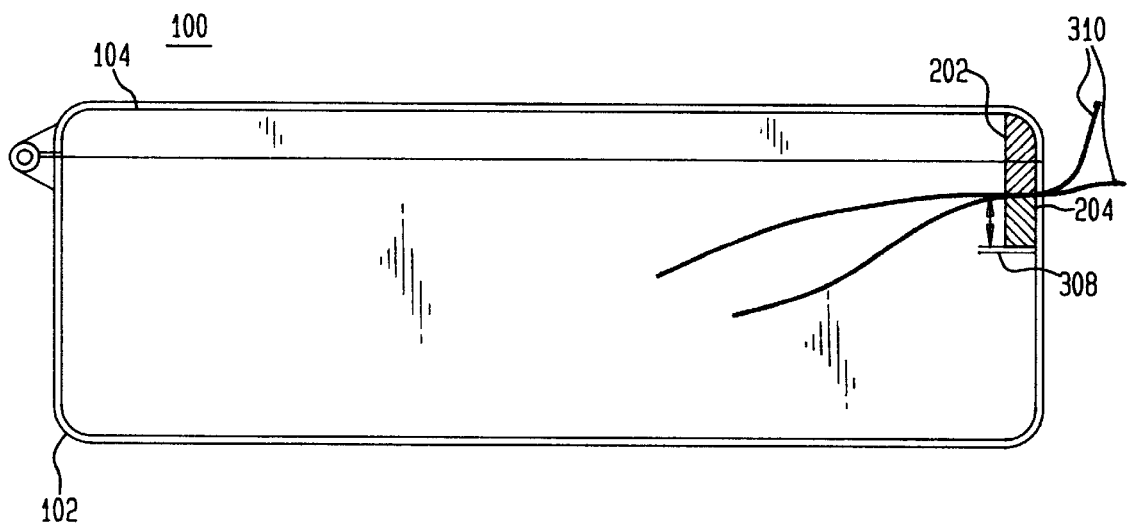

FIG. 3A shows a side view of a building entrance protector, similar to a side view of side 108 of BEP 100 of FIG. 1, in which inserts, similar to those shown in FIG. 2, have been mounted, according to the present invention, adjacent to the wire retainers 302 that are mounted within the BEP troughs. FIG. 3B shows a cross-section view of the BEP of FIG. 3A, similar to a cross section view of side 110 of BEP 100 of FIG. 1. In this implementation of the present invention, the larger insert 202 is attached to the BEP lid 104, while the smaller insert 204 is attached to a mounting ledge 308 in the BEP base 102, both inserts preferably as close to the trough as practicable (as shown in FIG. 3B).

In their uncompressed state, the combined height of the two inserts is preferably larger than the distance between their respective mounting surfaces when the BEP lid is closed. As such, even without any wires being fed through the aperture, the inserts will deform as a result of their mutual contact to provide a substantially dust-free seal in the aperture. FIGS. 3A and 3B show the level of insert 204, both in its uncompressed state when the lid is opened (304) and in its compressed state when the lid is closed (306). When wires 310 are fed through the aperture, insert compression will be greater and have deformations that follow the existing contours to maintain the substantially dust-free seal.

The inserts are preferably made of an elastic material that recovers its uncompressed shape when the lid is opened. In this way, the numbers of wires fed through the aperture can be either increased or decreased over time without adversely affecting the ability of the inserts to provide good sealing characteristics.

The present invention has advantages over conventional grommet-based schemes for sealing apertures in building entrance protectors. For example, the present invention does not require manipulation of the grommets to remove grommet material when the number of wires increase. Nor does the present invention require the costly replacement of grommets when the number of wires decreases.

Although the present invention has been described in the context of a building entrance protector having a base and a lid that define a single interior chamber, those skilled in the art will understand that the BEP may have intermediate levels that may define, with the lid and the base, two or more different interior chambers. As used in the claims, the terms "base" and "lid" are intended as relative terms indicating two adjacent levels that define one or more apertures in the BEP.

Similarly, although the invention has been described in the context of building entrance protectors, those skilled in the art will understand that the present invention can be applied to other types of enclosures for telecommunications equipment in which wires are fed through apertures in the enclosure walls.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An enclosure for telecommunications equipment, comprising a base and a lid pivotally connected to the base, the enclosure having an aperture defined by aperture edges through which one or more wires can be fed, wherein a first elastically deformable insert is attached to a mounting surface on the base and a second elastically deformable insert is attached to a mounting surface on the lid, both adjacent to the aperture, such that when the lid is closed, the first and second inserts deform under contact with each other and with any of the one or more wires fed through the aperture to reduce the size of gaps between the one or more wires and the aperture edges.

2. The invention of claim 1, wherein the combined height of the first and second inserts is greater than the distance between the respective mounting surfaces of the base and lid to which the inserts are attached.

3. The invention of claim 2, wherein each of said inserts has an adhesive backing for attaching each of the inserts to its mounting surface.

4. The invention of claim 3, wherein at least one of said inserts has one or more slots to provide non-continuous deformability.

5. The invention of claim 2, wherein at least one of said inserts has one or more slots to provide non-continuous deformability.

6. The invention of claim 1, wherein each of said inserts has an adhesive backing for attaching each of the inserts to its mounting surface.

7. The invention of claim 6, wherein at least one of said inserts has one or more slots to provide non-continuous deformability.

8. The invention of claim 1, wherein at least one of said inserts has one or more slots to provide non-continuous deformability.

* * * * *